US011538361B1

(12) United States Patent
Salla (10) Patent No.: US 11,538,361 B1
(45) Date of Patent: Dec. 27, 2022

(54) ROTATIONAL DEVICE

(71) Applicant: Omar Salla, Pembroke Pines, FL (US)

(72) Inventor: Omar Salla, Pembroke Pines, FL (US)

( * ) Notice: Subject to any disclaimer, the term of this patent is extended or adjusted under 35 U.S.C. 154(b) by 144 days.

(21) Appl. No.: 16/787,590

(22) Filed: Feb. 11, 2020

Related U.S. Application Data (60) Provisional application No. 62/803,904, filed on Feb. 11, 2019.

(51) Int. Cl.
*G09B 23/04* (2006.01)

(52) U.S. Cl.
CPC .................................. *G09B 23/04* (2013.01)

(58) Field of Classification Search
CPC ........ G09B 23/02; G09B 23/04; G09B 23/06; G09B 23/08; G09B 23/10
See application file for complete search history.

(56) References Cited

U.S. PATENT DOCUMENTS

| | | | |
|---|---|---|---|
| 3,063,521 A | 11/1962 | Fuller | |
| 3,203,144 A | 8/1965 | Fuller | |
| 3,327,801 A * | 6/1967 | Ezra | B60B 19/14 180/21 |
| 4,094,091 A * | 6/1978 | Kupperman | A63H 33/40 446/176 |
| 4,378,117 A | 3/1983 | Rubik | |
| 4,405,131 A | 9/1983 | Horvath | |
| 4,441,715 A | 4/1984 | Titus | |
| 4,513,970 A | 4/1985 | Opresco et al. | |
| 4,579,336 A * | 4/1986 | Morin | A63B 19/02 280/206 |
| 4,593,907 A | 6/1986 | Abu-Shumays et al. | |
| 4,701,131 A | 10/1987 | Hildebrandt et al. | |
| 4,729,446 A * | 3/1988 | Sefton | A63G 29/00 180/21 |
| 4,856,786 A | 8/1989 | Gyovai | |
| 4,865,323 A | 9/1989 | Heusinkveld | |
| 4,877,406 A | 10/1989 | Wilk | |
| 4,889,340 A | 12/1989 | Greene | |
| 5,074,562 A | 12/1991 | Green | |
| 5,308,066 A | 5/1994 | Pataki et al. | |

(Continued)

FOREIGN PATENT DOCUMENTS

| | | |
|---|---|---|
| GB | 2090749 | 7/1982 |
| WO | 2008026218 | 3/2008 |

*Primary Examiner* — Kurt Fernstrom
(74) *Attorney, Agent, or Firm* — The Patent Professor; John Rizvi, P.A.

(57) ABSTRACT

A rotational device is provided that enables a user to tangibly experience movement of a three-dimensional object in a four dimensional space. The rotational device includes an inner cubic frame assembly rotatably supported within an outer frame. The outer frame is formed from a series of wires connected at hubs to enable the user to view the movement of the inner cubic frame. A rotation mechanism may be provided to allow a user to rotate the inner cubic frame within the outer frame. A fixed internal cubic frame is mounted within the outer frame to support the inner cubic frame assembly. The inner cubic frame assembly includes an inner cubic frame and a sphere supported within the inner cubic frame. Reference points or nodes are provided on the inner cubic frame to provided visually traceable reference points as the inner cubic frame rotates within the outer frame and fixed internal cubic frame.

21 Claims, 6 Drawing Sheets

(56) References Cited

U.S. PATENT DOCUMENTS

| | | | | |
|---|---|---|---|---|
| 5,358,247 A | 10/1994 | Meffert | | |
| 5,360,363 A * | 11/1994 | Levin | ................ | A63H 33/18 |
| | | | | 446/236 |
| 5,566,941 A | 10/1996 | Destics | | |
| 5,651,679 A * | 7/1997 | Altman | ................ | G09B 23/04 |
| | | | | 359/616 |
| 5,816,571 A | 10/1998 | Chen | | |
| 5,826,871 A | 10/1998 | Li | | |
| 5,893,789 A * | 4/1999 | Wu | ................ | A63H 33/00 |
| | | | | 446/129 |
| 5,982,374 A | 11/1999 | Wahl | | |
| 6,158,740 A | 12/2000 | Hall | | |
| 6,491,563 B1 * | 12/2002 | Bailey | ................ | A63H 33/062 |
| | | | | 446/120 |
| 6,976,899 B1 * | 12/2005 | Tamanas | ................ | A63G 29/02 |
| | | | | 446/178 |
| 7,547,019 B2 | 6/2009 | Chen | | |
| 7,694,463 B2 * | 4/2010 | Lanahan | ................ | E04B 1/19 |
| | | | | 52/81.1 |
| 7,823,884 B2 | 11/2010 | Cantner | | |
| D646,735 S * | 10/2011 | Nichols | ................ | D21/707 |
| 8,528,854 B2 * | 9/2013 | Yan | ................ | A63H 27/12 |
| | | | | 244/17.23 |
| 8,636,521 B2 * | 1/2014 | Pacheco | ................ | G09B 23/10 |
| | | | | 434/300 |
| 9,061,558 B2 * | 6/2015 | Kalantari | ................ | B64C 39/024 |
| 9,611,032 B2 * | 4/2017 | Briod | ................ | B64C 39/024 |
| 9,725,170 B2 * | 8/2017 | Daler | ................ | B64C 17/00 |
| 2002/0166294 A1 | 11/2002 | Rogers | | |
| 2010/0068967 A1 * | 3/2010 | Hume | ................ | A63F 7/042 |
| | | | | 446/69 |
| 2010/0301558 A1 | 12/2010 | Speegle | | |
| 2013/0095901 A1 * | 4/2013 | Houlis | ................ | G09B 23/00 |
| | | | | 463/9 |

* cited by examiner

ROTATIONAL DEVICE

CROSS-REFERENCE TO RELATED APPLICATION

This application claims the benefit of U.S. Provisional Patent Application No. 62/803,904, filed on Feb. 11, 2019, which is incorporated by reference herein in its entirety.

FIELD OF THE INVENTION

The present invention relates generally to educational and/or demonstration devices, and more particularly, to a device to allow a user to tangibly experience movement of a three-dimensional object in four dimensions.

BACKGROUND OF THE INVENTION

It is important when teaching or demonstrating new material that the student or subject fully grasp and understand the details of the topic being demonstrated or taught. For example, while most people can understand the concept of three dimensions, the concept of four dimensions is often difficult to grasp. Three-dimensional objects are present everywhere in people's daily lives and the concepts pertaining to three dimensions are easily displayed and understood by the average person. However, when a fourth dimension is introduced, in the form of the relationship of two three-dimensional objects, and the varying shapes of the space(s) between them over time, people often have a difficult time understanding or visualizing the concept of this additional dimension as it relates to three-dimensional objects and how they interact in pairs.

The tesseract is known, and consists in a four-dimensional analogue of the cube that attempts to depict the movement and change of the spaces between two three-dimensional objects over time. The concept of a cubic tesseract sphere is also known and is illustrated in books and in videos. Computer animations of the movements associated with cubic tesseract sphere are also available and attempt to provide visual depictions of the movement of a three-dimensional object in a four dimensional space. These depictions show how one three-dimensional object is positioned over time relative to another three-dimensional object or reference frame.

However, these attempts to convey the concepts of one three-dimensional object moving relative to another three-dimensional object and, more particularly the movement of the shapes occupied in the spaces between them, are still only displayed in two dimensions on a page or on a screen.

Accordingly, there is an established need for a practical device to physically and tangibly demonstrate the motion of three-dimensional objects relative to each other over time including the variations in the shapes and orientations of spaces defined between each of the three-dimensional objects.

SUMMARY OF THE INVENTION

The present invention is directed to a novel and useful rotational device similar to a cubic tesseract sphere that enables a user to tangibly experience movement of a three-dimensional object in a four dimensional space. The disclosed rotational device provides an actual three-dimensional experience in real time greatly increasing a user understanding of movement of a three-dimensional object relative to a fixed point or points of reference over a period of time than is possible with a simple visual depiction or animation. The rotational device includes an inner cubic frame assembly rotatably supported within an outer frame. The outer frame may be formed from a series of wires to enable the user to view the movement of the inner cubic frame. A rotation mechanism may be provided to allow a user to rotate the inner cubic frame within the outer frame. The disclosed rotational device can be used by people of all ages to better understand how time, space and matter work in pairs. This may find application by extension to the development of religions, the operation of plant and animal cells, atoms or molecules, male female interactions over time, etc. and may be provided as a science tool, a toy, etc.

Introducing a first embodiment of the invention, the present invention consists of a rotational device for tangibly experiencing movement of a three-dimensional object in four dimensions, comprising:

an outer frame comprising a plurality of wires forming a three-dimensional structure defining an interior of the outer frame, wherein the wires are arranged in spaced-apart configuration with one another enabling visibility of the interior of the outer frame from outside the outer frame; and an inner cubic frame assembly movably mounted for rotation within the interior of the outer frame, wherein the inner cubic frame assembly is visible from outside the outer frame.

In a second aspect, the inner cubic frame assembly may be rotatably supported by two points of the outer frame, the two points defining a rotation axis of the inner cubic frame assembly.

In another aspect, the inner cubic frame assembly may be rotatably coupled to, and carried by, the outer frame at the two points.

In another aspect, the outer frame may further include a plurality of hubs. The wires may connect to and extend from the plurality of hubs.

In another aspect, an outer side of the outer frame defined by outer sides of the plurality of wires may be shaped as a sphere.

In another aspect, the plurality of wires may include a first wire subset including one or more wires arranged forming a first great circle on a first plane.

In another aspect, the plurality of wires may include a second wire subset comprising one or more wires arranged forming a second great circle on a second plane, wherein the first and second planes form an angle other than 90 degrees with each another.

In another aspect, the plurality of wires may include a second wire subset comprising one or more wires arranged forming a second great circle on a second plane, wherein the first and second planes are perpendicular to each another.

In another aspect, the plurality of wires may include a third wire subset comprising one or more wires arranged forming a third great circle on a third plane. The first, second and third planes may be perpendicular to each another.

In another aspect, the plurality of wires may extend along a plurality of great circles of the sphere.

In another aspect, the rotational device may further include a fixed internal cubic frame fixedly attached to and arranged inward of the outer frame. The fixed internal cubic frame may rotatably support the inner cubic frame assembly.

In another aspect, the outer frame may be formed of first and second frame halves.

In another aspect, the first and second frame halves may be disconnectably mountable to one another.

In another aspect, the fixed internal cubic frame may include a first series of legs carried by the first frame half and a second series of legs carried by the second frame half. The first and second series of legs may be configured to interconnect and form a cubic shape when the first and second frame halves are mounted to one another to form the outer frame.

In another aspect, the inner cubic frame assembly may include a cubic frame and a sphere mounted within the cubic frame.

In another aspect, the sphere may be rigidly and non-movably connected to the cubic frame.

In another aspect, the sphere may be mounted to the cubic frame such that the sphere is movable relative to the cubic frame.

In another aspect, the rotational device may further include a rotation mechanism extending through the outer frame and engaging the inner cubic frame assembly such that rotation of the rotation mechanism rotates the inner cubic frame assembly within the outer frame. The rotation mechanism may include a user-operable section arranged outside the outer frame and manually operable to cause rotation of the rotation mechanism.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a rotational device that is capable representing the movement of a three-dimensional object within a four dimensional space. The invention can be used for educational purposes, for instance and without limitation.

Figure 1:
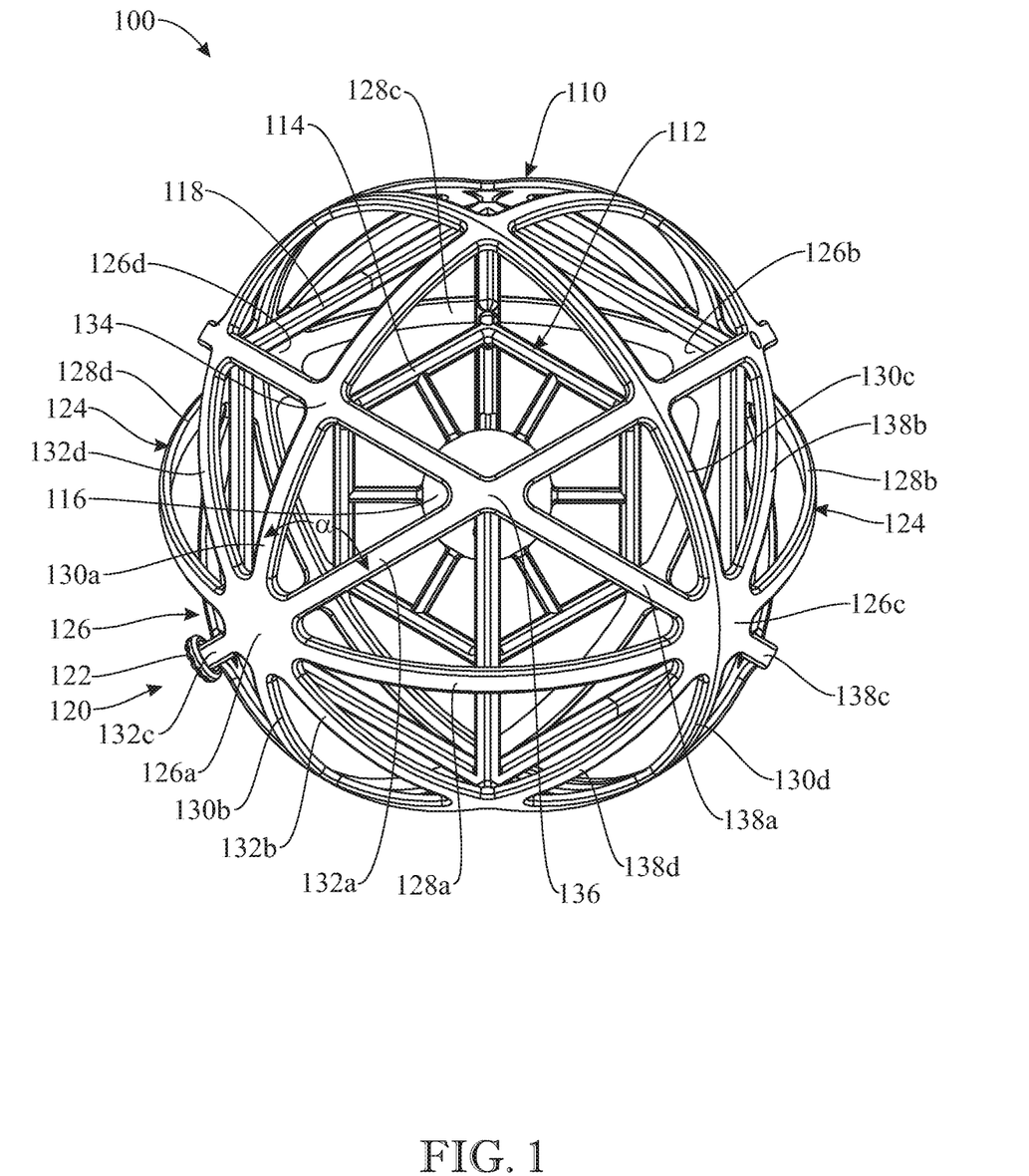
FIG. 1 presents a front view of a rotational device in accordance with an illustrative embodiment of the present invention.
Figure 2:
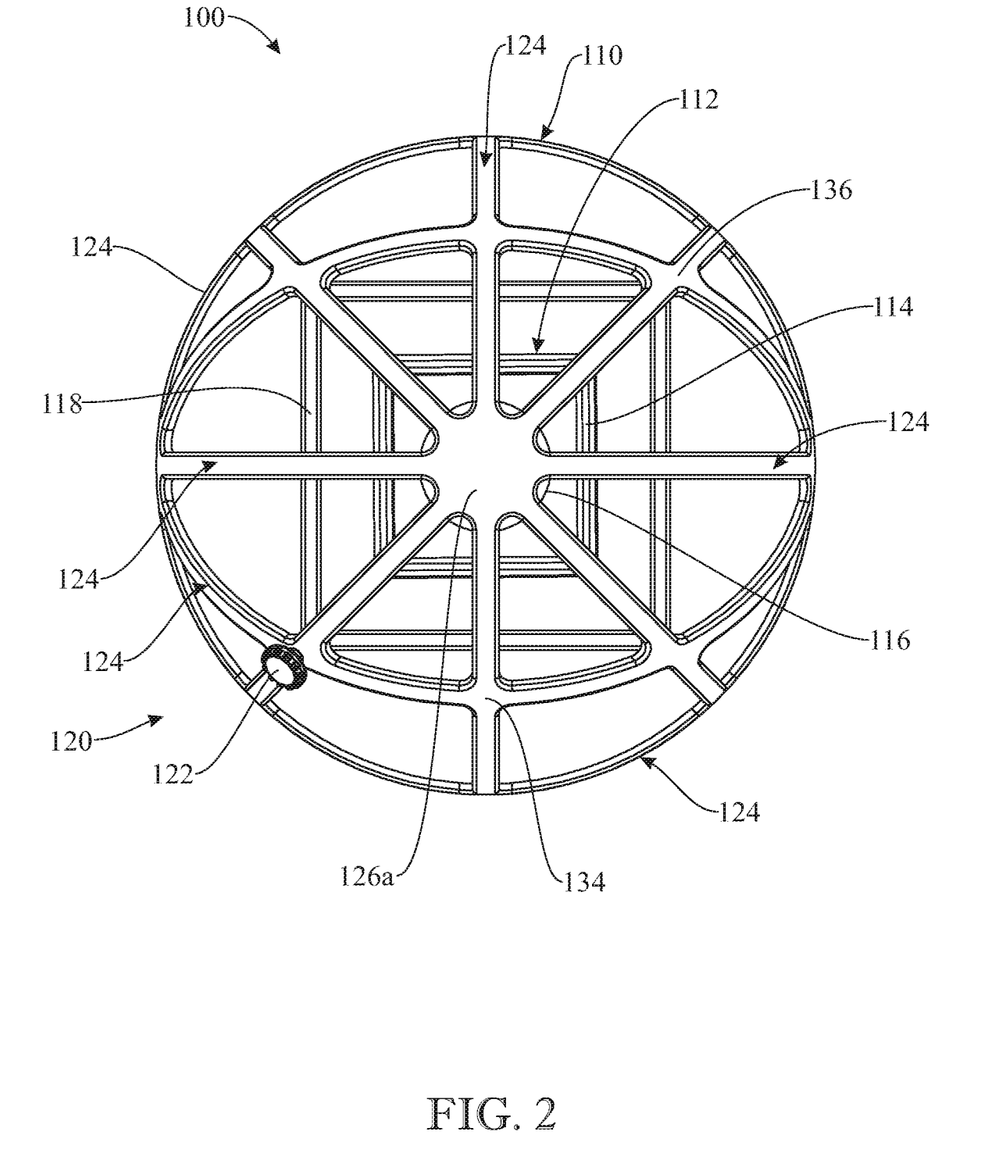
FIG. 2 presents a rear view of the rotational device.
Figure 3:
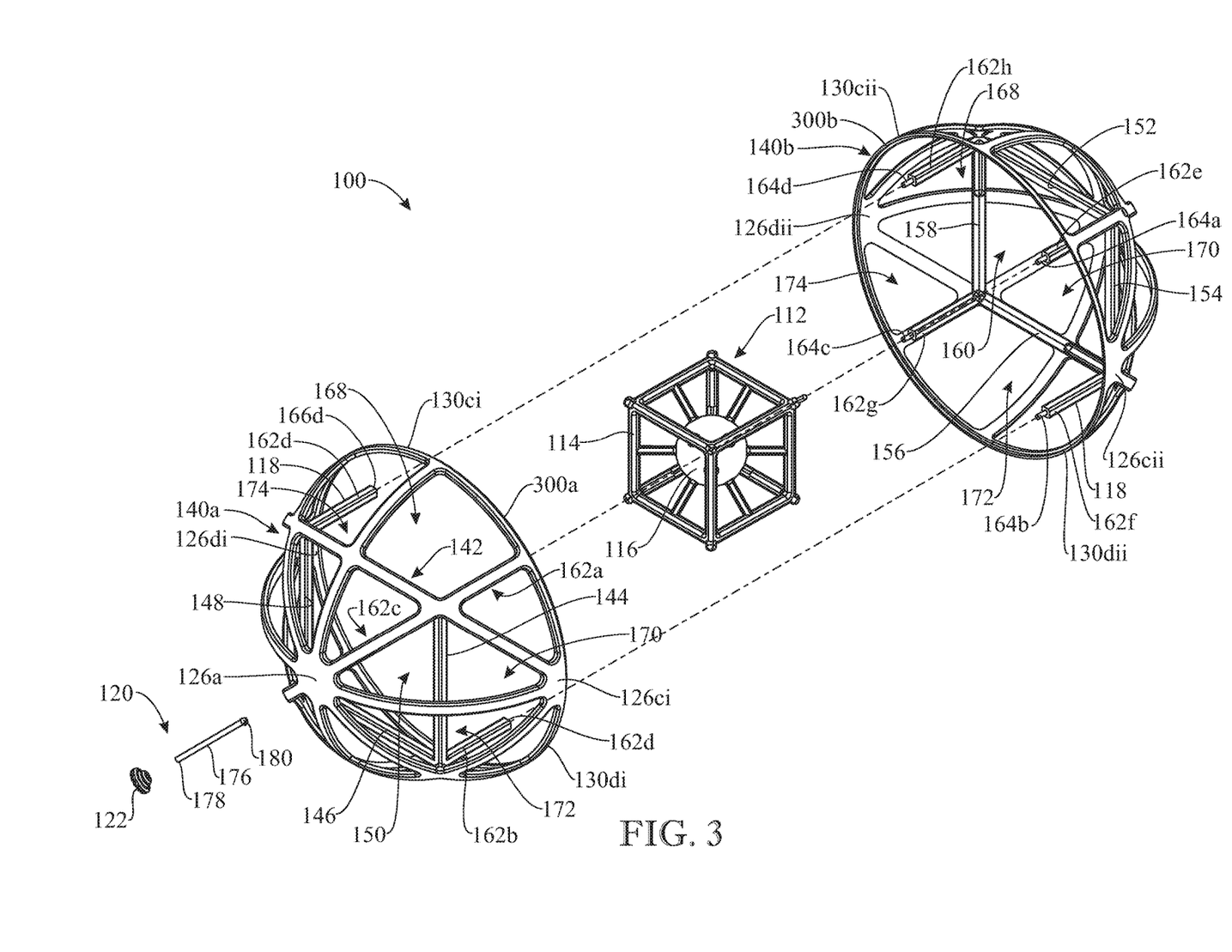
FIG. 3 presents an exploded, isometric view of the rotational device, showing an outer frame partitioned into semi-spheres, an inner cubic frame assembly and a rotation mechanism for rotating the inner cubic frame assembly within the outer frame of the rotational device.

Referring initially to FIGS. 1-3, a rotational device 100 is illustrated in accordance with an exemplary embodiment of the present invention, configured as a manually-rotatable cube within an outer body, which can be spherical in some embodiments of the invention. As shown, the rotational device 100 generally includes an outer frame 110, which can be spherical as shown or present alternative shapes, and an inner cubic frame assembly 112, best shown in FIG. 3, rotatably mounted within the outer frame 110. With continued reference to FIG. 3, the inner cubic frame assembly 112 has a cubic frame 114 and an inner sphere 116, which is fixedly mounted within the cubic frame 114. A fixed internal cubic frame 118 is located within the outer frame 110 and is non-movable relative to the outer frame 110. The fixed internal cubic frame 118 rotatably supports the inner cubic frame assembly 112 within the outer frame 110. A rotation mechanism 120, having a rotatable knob 122, may extend through the outer frame 110 and may be in engagement with the inner cubic frame assembly 112 to rotate the inner cubic frame assembly 112 within the outer frame 110 to demonstrate the movement of a three-dimensional body within a four dimensional space as discussed in more detail hereinbelow.

In accordance with the present disclosure, the inner cubic frame assembly 112 is visible through the outer frame 110 to enable the user to observe the movement of the three-dimensional inner cubic frame assembly 112 within the three-dimensional outer frame 110. For example, as shown in FIG. 1, the outer frame 110 may be formed from a series of arms or wires 124 extending from and between a plurality of hubs 126. In this embodiment, the outer frame 110 is formed with a plurality of hubs 126 specifically comprised of four hubs 126*a*, 126*b*, 126*c* and 126*d*. Hubs 126*a* and 126*b* are located diametrically opposite each other about the outer frame 110 and hubs 126*c* and 126*d* are also located diametrically opposite each other about the outer frame 110.

With specific reference to FIG. 1, each of the hubs 126*a-d* has eight wires 124 extending outwardly therefrom (i.e. from the hub 126*a-d*). The eight wires 124 include four short wires 128*a*, 128*b* 128*c* and 128*d*. Two of the short wires 128*a-d* extend from each of the hubs 126*a-d*. For example, the short wire 128*a* extends between the hubs 126*a* and 126*c*, the short wire 128*b* extends between the hub 126*c* and 126*b*, the short wire 128*c* extends between the hub 126*b* and 126*d*, and the short wire 128*d* extends between the hub 126*d* and 126*a*. The short wires 128*a-d* are coplanar and define a first plane which extends through the outer frame 110. In some embodiments, such as the present embodiments, the coplanar short wires 128a-d are arranged along a great circle of the spherical outer frame 110.

The remaining wires 124 which extend from the hubs 126a-d are longer than the four short wires 128a-d. Specifically, in the present embodiment, four perpendicular wires 130a, 130b, 130c and 130d of the wires 124 extend from each hub perpendicular to the four short wires 128a-d and the plane defined thereby. For example, the perpendicular wire 130a extends between hubs 126a and 126b and lies along a plane perpendicular to plane formed by the four short wires 128a-d. The perpendicular wire 130b also extends between the hub 126a and 126b. Together, the perpendicular wires 130a and 130b define another great circle of the spherical outer frame 110, arranged on a plane perpendicular to the plane defined by the short wires 128a-d. Similarly, the perpendicular wire 130c extends between the hub 126c and 126d while the perpendicular wire 130d also extends between the hub 126c and the hub 126d. Together, the perpendicular wires 130c and 130d define yet another great circle of the spherical outer frame 110, which defines a plane perpendicular to both the plane defined by the short wires 128a-d and the plane defined by the two perpendicular wires 130a and 130b.

The remaining wires 124 extending from the hubs 126a-d include a first set of angled wires 132a-d which are also longer than the short wires 128a-d and extend from and between the hubs 126a and 126b at an angle of approximately 45° to the short wires 128a-d and to the perpendicular wires 130a and 130b. More specifically, as shown, the angled wires 132a and 132c extend in opposite directions from the hub 126a to the hub 126b forming a great circle arranged at an angle α of 45° from the perpendicular wire 130a. In turn, the angled wires 132b and 132d extend in opposite directions from the hub 126a to the hub 126b forming a great circle arranged at an angle of 45° from the perpendicular wire 130a.

Likewise, a second set of angled wires 138a-d which are also longer than the short wires 128a-d extend from and between the hubs 126c and 126d at an angle of approximately 45° to the short wires 128a-d and to the perpendicular wires 130c and 130d. More specifically, as shown, the angled wires 138a and 138c extend in opposite directions from the hub 126c to the hub 126d forming a great circle arranged at an angle of 45° from the perpendicular wire 130c. In turn, the angled wires 138b and 138d extend in opposite directions from the hub 126c to the hub 126d forming a great circle arranged at an angle of 45° from the perpendicular wire 130c.

As shown in FIG. 1, the wires 124 intersect along the outer frame 100. The intersections of the wires 124 about the outer frame 110 are formed with different angles, such as a 900 right angle intersection 134 or an angled intersection 136 of an angle other than 90°.

Thus, together, the hubs 126a-d and the wires 124 including the short wires 128a-d, the perpendicular wires 130a-d, the angled wires 132a-d and the angled wires 138a-d form the spherical shape of the outer frame 110 of the present embodiment and allow the movement of the inner cubic frame assembly 112 to be visible through the outer frame 110. The orientation of the short wires 128a-d, the perpendicular wires 130a-d, the angled wires 132a-d and the angled wires 138a-d, and the various planes defined thereby, alone or together, can be used as points, lines, circles, planes, or other reference items to illustrate the motion of the three-dimensional inner cubic frame assembly 112 relative to a fixed coordinate or coordinates through time.

Referring now to FIG. 3, in order to facilitate assembly of the rotational device 100, the perpendicular wires 130c and 130d along with the hubs 126c and 126d are split in half to form two semi-spheres or outer frame halves 140a and 140b. Specifically, perpendicular wire 130c is split into wire halves 130ci and 130cii and perpendicular wire 130d is split into wire halves 130di and 130dii. Similarly, hub 126c is split into hub halves 126ci and 126cii and hub 126d is split into hub halves 126di and 126dii. In order to better align the outer frame halves 140 and 140b together to prevent slipping apart, the wire halves 130ci and 130cii have overlapping and/or interlocking edges 300a and 300b (see also FIG. 6). Likewise, the wire halves 130di and 130dii also may have overlapping and/or interlocking edges 302a and 302b (see also FIG. 6).

As noted hereinabove, the rotational device 100 includes the fixed internal cubic frame 118 which is located within and fixedly attached to the outer frame 110. The fixed internal cubic frame 118 has four legs 142, 144, 146 and 148 which define (i.e. are arranged forming) a first square 150 within the first outer frame half 140a and four legs 152, 154, 156 and 158 which define (i.e. are arranged forming) a second square 160 within the second outer frame half 140b.

In order to connect the first outer frame half 140a to the second outer frame half 140b, the remaining legs of the fixed internal cubic frame 118 are split into semi-legs. For example, the first square 150 has four semi-legs 162a, 162b, 162c and 162d extending perpendicularly from the first square 150 and the second square 160 has four semi-legs 162e, 162f, 162g and 162h extending perpendicularly from the second square 160. Each of the four semi-legs 162e-h terminate in pins 164a-d while each of the four semi-legs 162a-d terminate in corresponding holes 166a-d configured to receive the pins 164a-d, respectively. The first and second outer frame halves 140a and 140b may be connected together by various known means such as, for example, friction fit, gluing, welding, etc. For example, the pins 164a-d may be inserted into and retaining within the holes 166a-d, respectively, in friction fit fashion such that the first and second outer frame halves 140a and 140b may be taken apart to repair or replace the inner cubic frame assembly 112 with a similar or dissimilar object to express the motion of a different three-dimensional object with respect to the outer frame 110 and/or the fixed internal cubic frame 118 through time. Once connected, the legs 142, 144, 146, 148, 152, 154, 156 and 158 define the remaining four squares 168, 170, 172 and 174, or square sides, which, along with the first and second squares 150 and 160, or square sides, define the cubic shape of the fixed internal cubic frame 118.

Alternatively, where the assembly of the first and second outer frame halves 140a and 140b is intended to be relatively permanent, the pins 164a-d may be glued or otherwise fused within the holes 166a-d. Additionally, the perpendicular wire halves 130ci and 130cii and the perpendicular wire halves 130di and 130dii along with the hub halves 126ci and 126cii and 126di and 126dii may also be glued or otherwise fused together to complete the outer frame 110.

Figure 4:
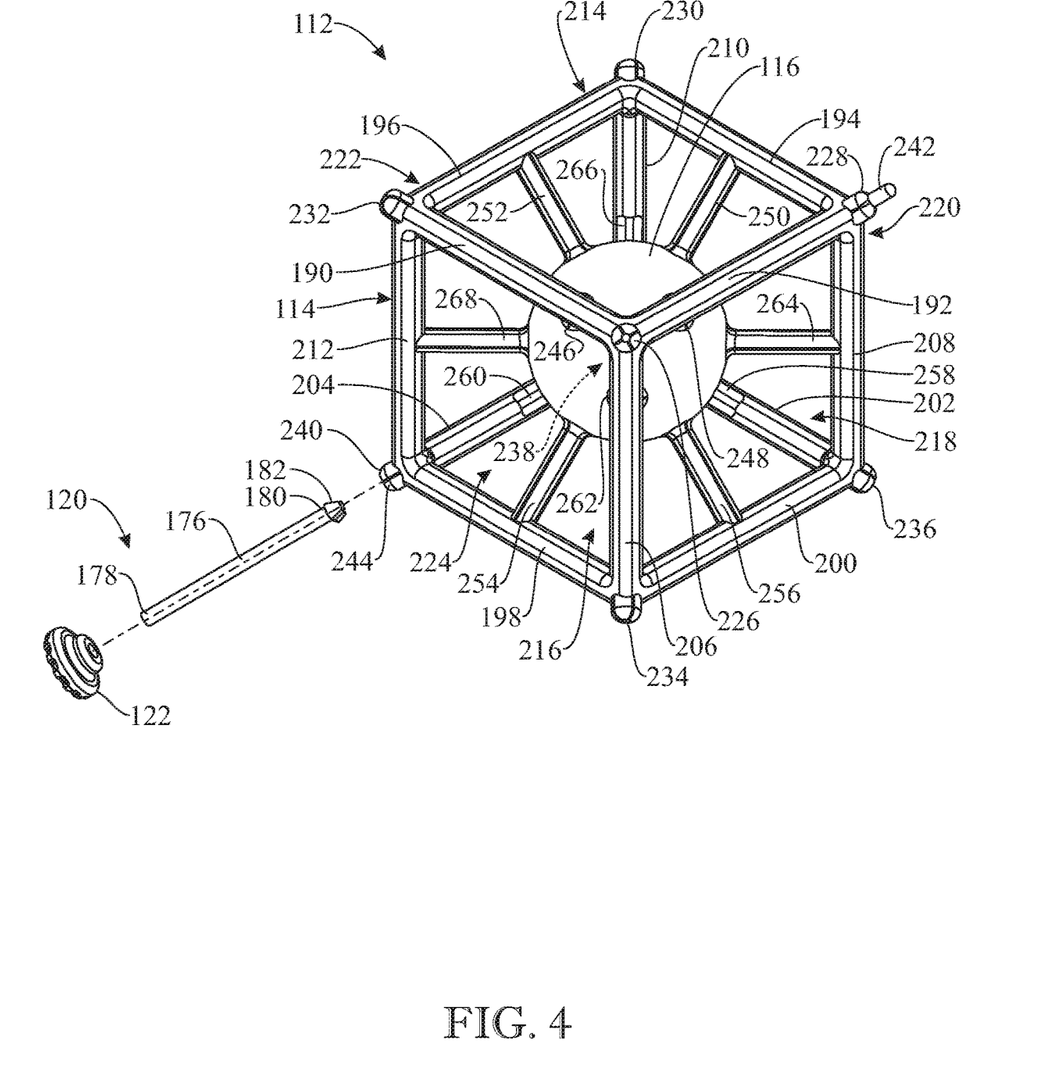
FIG. 4 presents an isometric view of the rotation mechanism and inner cubic frame assembly of the rotational device.

Referring now to FIGS. 3 and 4, the rotation mechanism 120 includes the rotatable knob 122 and a rotatable shaft 176 which is connected to the rotatable knob 122 and the cubic frame 114. Specifically, a first end 178 of the rotatable shaft 176 is connected to the rotatable knob 122 and a second end 180 of the rotatable shaft 176 is connected to the inner cubic frame assembly 112, such as to the cubic frame 114 of the inner cubic frame assembly 112.

As best shown in FIG. 4, the second end 180 of the rotatable shaft 176 is provided with an enlarged or conical head 182 which is configured to engage the cubic frame 114 in order to rotate the inner cubic frame assembly 112 in response to rotation of the rotatable knob 122. As discussed in more detail hereinbelow with regard to FIG. 6, the rotatable shaft 176 passes through and is supported by one of the intersections in the outer frame 110 and one of a series of inwardly directed arms associated with the fixed internal cubic frame 118.

With continued reference to the enlarged view of FIG. 4, the cubic frame 114 is formed from a series of legs 190, 192, 194 and 196; legs 198, 200, 202 and 204; and legs 206, 208, 210 and 212 which form the cubic shape of the cubic frame 114. The legs 190, 192, 194 and 196 define a top or first square 214 of the cubic frame 114. The legs 198, 200, 202 and 204 define a bottom or second square 216 of the cubic frame 114. The remaining side or third, fourth, fifth and sixth squares, 218, 220, 222 and 224, respectively, are defined by the disclosed legs as well. Specifically, the third square 218 is defined by the legs 192, 200, 206 and 208. The fourth square 220 is defined by the legs 194, 202, 208 and 210. The fifth square 222 is defined by the legs 196 204, 210 and 212. Finally, the sixth square 224 is defined by the legs 190, 198, 206 and 212. The first, second, third, fourth, fifth and sixth squares 214, 216, 218, 220, 222 and 224 define the cubic shape of the cubic frame 114.

At the intersections of the legs, the cubic frame 114 includes outwardly projecting reference points or nodes 226, 228, 230, 232, 234, 236, 238 and 240 which function to track or trace the movement of the cubic frame 114 as it is rotated within the outer frame 110. The node 226 extends outwardly from the intersection of legs 190, 192 and 206. The node 228 extends outwardly from the intersection of legs 192, 194 and 208. The node 230 extends outwardly from the intersection of legs 194, 196 and 210. The node 232 extends outwardly from the intersection of legs 190, 196 and 212. The node 234 extends outwardly from the intersection of legs 198, 200 and 206. The node 236 extends outwardly from the intersection of legs 200, 202 and 208. The node 238 (hidden behind the sphere 116) extends outwardly from the intersection of legs 202, 204 and 210. Finally, the node 240 extends outwardly from the intersection of legs 198, 204 and 212.

The inner cubic frame assembly 112 is rotatably supported within the outer frame 110 at two locations. The first is at the node 228 which includes a projecting pin 242 configured to engage an arm (described hereinbelow with regard to FIG. 6) of the fixed inner cubic frame 118 and the second is at a recess 244 in the node 240 which is configured to rotatably receive and support the conical head 182 on the second end 180 of the rotatable shaft 176.

As noted above, the inner sphere 116 is supported within the cubic frame 114. For instance, the inner sphere 116 may be supported or suspended within the cubic frame 114 by suspension arms 246, 248, 250 and 252 extending from legs 190, 192, 194 and 196, respectively. The inner sphere 116 may be further supported or suspended within the cubic frame 114 by suspension arms 254, 256, 258 and 260 extending from legs 198, 200, 202 and 204, respectively. Additionally, the inner sphere 116 may be supported or suspended within the cubic frame 114 by suspension arms 262, 264, 266 and 268 extending from legs 206, 208, 210 and 212, respectively. As shown, each suspension arm 246, 248, 250, 252, 254, 256, 258, 260, 262, 264, 266 and 268 may extend perpendicularly from the respective leg 190, 192, 194, 196, 198, 200, 202, 204, 206, 208, 210 and 212 and towards a center of the cubic frame 114 which coincides with the center of the inner sphere 116. In different embodiments of the invention, the disclosed suspension arms may be rigid or flexible to respectively prevent or enable inner sphere 116 to move relative to cubic frame 114 as well as to the outer frame 110 and the fixed internal frame 118.

The disclosed rotational device 100 and its components may be formed from a variety of materials such as, for example, metallic materials, polymeric materials, ceramic material, wood or wood based products, etc. The rotational device 100 may be formed by three-dimensional printing, molding, forming parts on a lathe, etc. More importantly, each of the components of the rotational device 100 including the outer frame 110, the cubic frame 114, the inner sphere 116 and the fixed internal cubic frame 118 may be formed with differing colors or textures to better enable a user to visualize and experience the relative motions of the components and the spaces therebetween relative to each other over time. All the disclosed support or suspension legs and arms along with the nodes may also be colored to easily identify movement and fixed points of reference. Furthermore, in different embodiments, the inner sphere 116 may be solid or hollow and may be formed from a variety of materials or include coatings to better enable its visibility as it moves within the outer frame 110.

Figure 5:
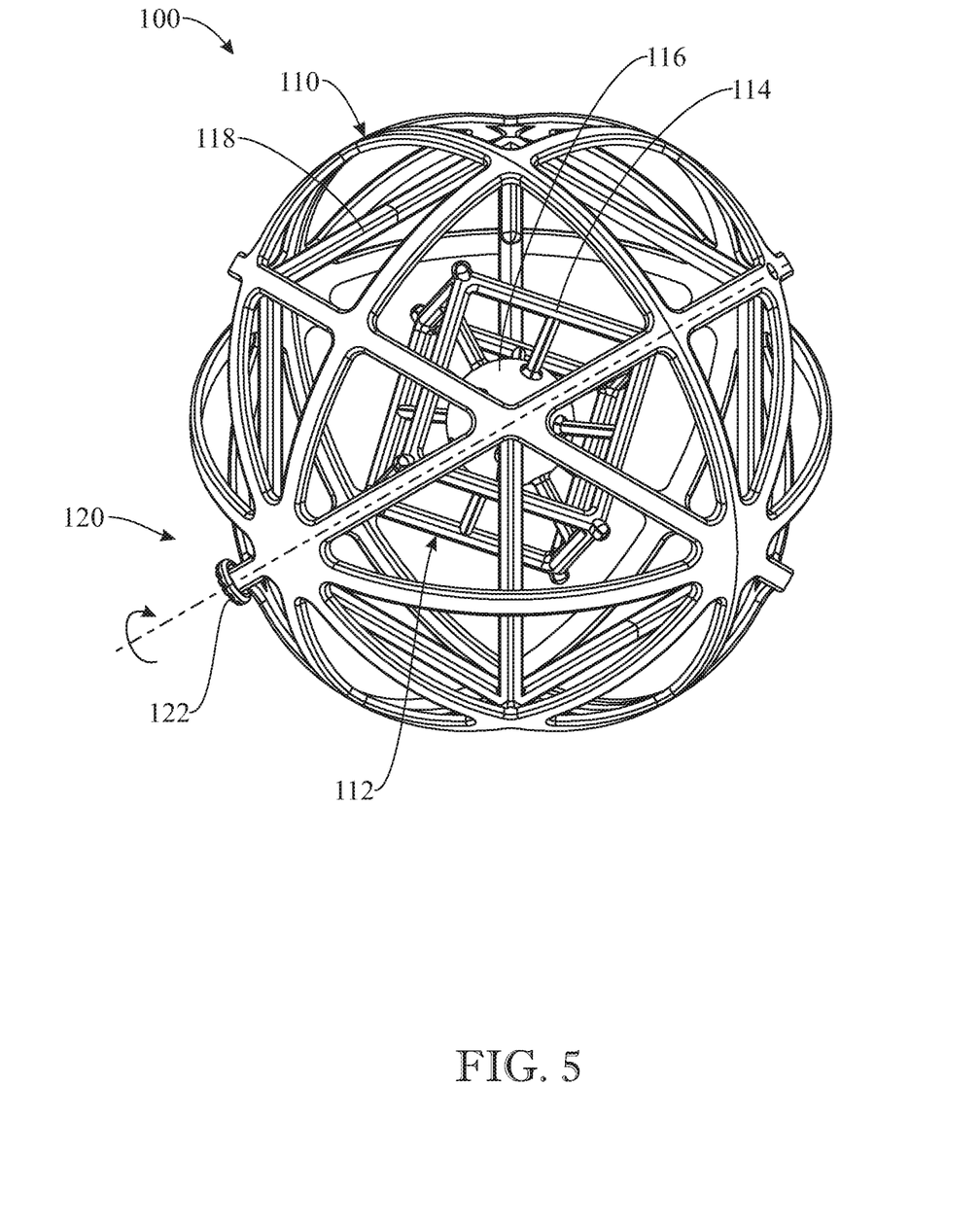
FIG. 5 presents a front view of the rotational device with the inner cubic frame assembly being rotated within the outer frame by the rotation mechanism.
Figure 6:
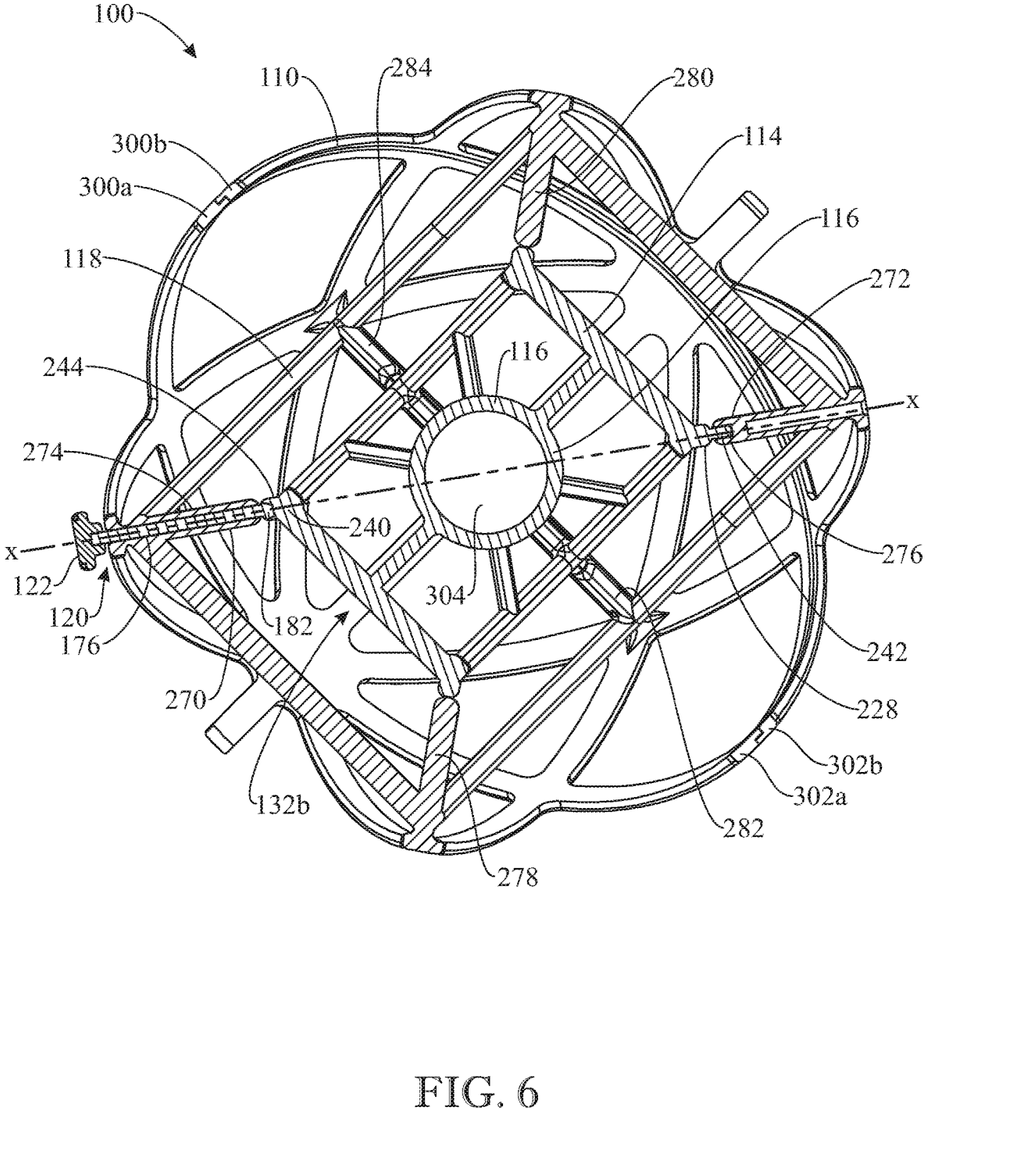
FIG. 6 presents a cross-sectional view of the rotational device, similar to FIG. 5 and illustrating points of support and rotational axis of the inner cubic frame assembly within the outer frame.

Turning now to FIGS. 5 and 6, the use of the rotational device 100 to enable a user to experience the movement of a three-dimensional object within four dimensions will now be described. Initially with regard to FIG. 5, the rotational device 100 is assembled as described hereinabove. The user can grasp the outer frame 110 or set it on a fixed surface such as, for example, a table, towel, pillow, etc. to keep it stationary and then rotate the inner cubic frame assembly 112 by turning the rotatable knob 122. Since the inner cubic frame assembly 112 is supported at two opposing corners or nodes 240 and 242 (FIGS. 4 and 6), the inner cubic frame assembly 112 turns within the outer frame 110 and the fixed internal cubic frame 118 along a rotation axis x-x (FIG. 6). The rotatable knob 122 may be continually turned to rotate the inner cubic frame assembly 112 over a period of time to enable a user to experience the movement of a three-dimensional object, i.e. the inner cubic frame assembly 112, within a fourth dimension i.e., time relative to a frame of reference fixed in time, i.e., the outer frame 110. The user can also see how the spaces or planes defined between the inner cubic frame assembly 112 and the outer frame 110 change over time as the device is operated.

Referring specifically to FIG. 6, the fixed internal cubic frame 118 includes inwardly directed support arms 270 and 272 for rotatably supporting the inner cubic frame assembly 112 within the outer frame 110. The rotatable shaft 176 of the rotation mechanism 120 extends through a bore 274 formed through support arm 270. As noted hereinabove, the conical head 182 of the rotatable shaft 176 is inserted into the recess 244 formed in the node 240 of the cubic frame 114 to rotatably support the inner cubic frame assembly 112. Likewise, the pin 242 extending from the node 228 of the cubic frame 114 is rotatably supported within a recess 276 formed in the support arm 272. Thus, the inner cubic frame assembly 112 is rotatably supported within the outer frame 110 and the fixed internal cubic frame 118.

It should be noted that the fixed internal cubic frame 118 includes additional inwardly directed reference arms which extend from the disclosed legs and intersections of legs of the fixed internal cubic frame 118 and which are spaced a minute distance from the nodes on the cubic frame 114. Some of these additional inwardly directed reference arms are shown in FIG. 6 as arms 278, 280, 282, etc. These additional reference arms provide additional reference points adjacent to which the nodes on the cubic frame 114 move relatively as the inner cubic frame assembly 112 is rotated to further enable a user to experience the motion of an object, a node, a space, a plane, etc. relative to a fixed object, such as, for example, the arm, over time. It should be noted that, while not specifically illustrated, there are preferably reference arms extending inwardly from each leg of the fixed internal cubic frame 118 as well as from each intersection of the legs of the fixed internal cubic frame 118. The reference arms are of a length that approaches the nodes without engaging the nodes or otherwise inhibiting the rotation of the inner cubic frame assembly 112 within the outer frame 110.

It should be noted that, in this embodiment, the inner sphere 116 is hollow defining an internal cavity 304, as shown in FIG. 6. This lightens the weight of the inner sphere 116, and thus the inner cubic frame assembly 112 as a whole, to better enable the inner cubic frame assembly 112 to rotate freely within the outer frame 110.

In summary, the disclosed rotational device 100 provides a tangible device to enable a user to physically experience and observe the movement of a three-dimensional object in four dimensions.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A rotational device for tangibly experiencing movement of a three-dimensional object in four dimensions, comprising:
   an outer frame comprising a plurality of wires forming a three-dimensional structure defining an interior of the outer frame, wherein the wires are arranged in spaced-apart configuration with one another enabling visibility of the interior of the outer frame from outside the outer frame;
   an inner cubic frame assembly movably mounted for rotation within the interior of the outer frame, wherein the inner cubic frame assembly is visible from outside the outer frame; and
   a fixed internal cubic frame fixedly attached to and arranged inward of the outer frame, wherein the fixed internal cubic frame rotatably supports the inner cubic frame assembly.

2. The rotational device of claim 1, wherein the inner cubic frame assembly is rotatably supported by two points of the outer frame, the two points defining a rotation axis of the inner cubic frame assembly.

3. The rotational device of claim 2, wherein the inner cubic frame assembly is rotatably coupled to, and carried by, the outer frame at the two points.

4. The rotational device of claim 1, wherein the outer frame further comprises a plurality of hubs, wherein the wires connect to and extend from the plurality of hubs.

5. The rotational device of claim 1, wherein an outer side of the outer frame defined by outer sides of the plurality of wires is shaped as a sphere.

6. The rotational device of claim 5, wherein the plurality of wires comprises a first wire subset including one or more wires arranged forming a first great circle on a first plane.

7. The rotational device of claim 6, wherein the plurality of wires comprises a second wire subset including one or more wires arranged forming a second great circle on a second plane, wherein the first and second planes form an angle other than 90 degrees with each another.

8. The rotational device of claim 6, wherein the plurality of wires comprises a second wire subset including one or more wires arranged forming a second great circle on a second plane, wherein the first and second planes are perpendicular to each another.

9. The rotational device of claim 8, wherein the plurality of wires comprises a third wire subset including one or more wires arranged forming a third great circle on a third plane, wherein the first, second and third planes are perpendicular to each another.

10. The rotational device of claim 5, wherein the plurality of wires extends along a plurality of great circles of the sphere.

11. The rotational device of claim 1, wherein the outer frame is formed of first and second frame halves.

12. The rotational device of claim 11, wherein the first and second frame halves are disconnectably mountable to one another.

13. The rotational device of claim 11, wherein the fixed internal cubic frame comprises a first series of legs carried by the first frame half and a second series of legs carried by the second frame half, wherein the first and second series of legs are configured to interconnect and form a cubic shape when the first and second frame halves are mounted to one another to form the outer frame.

14. The rotational device of claim 1, wherein the inner cubic frame assembly, comprises a cubic frame and a sphere mounted within the cubic frame.

15. The rotational device of claim 14, wherein the sphere is rigidly and non-movably connected to the cubic frame.

16. The rotational device of claim 14, wherein the sphere is mounted to the cubic frame such that the sphere is movable relative to the cubic frame.

17. The rotational device of claim 1, further comprising a rotation mechanism extending through the outer frame and engaging the inner cubic frame assembly such that rotation of the rotation mechanism rotates the inner cubic frame assembly within the outer frame, wherein the rotation mechanism comprises a user-operable section arranged outside the outer frame and manually operable to cause rotation of the rotation mechanism.

18. A rotational device for tangibly experiencing movement of a three-dimensional object in four dimensions, comprising:
   an outer frame comprising a plurality of wires forming a three-dimensional structure defining an interior of the outer frame, wherein the wires are arranged in spaced-apart configuration with one another enabling visibility of the interior of the outer frame from outside the outer frame, wherein an outer side of the outer frame defined by outer sides of the plurality of wires is shaped as a sphere, and wherein the plurality of wires extends along a plurality of great circles of the sphere; and
   an inner cubic frame assembly movably mounted for rotation within the interior of the outer frame, wherein the inner cubic frame assembly is visible from outside the outer frame, and further wherein the inner cubic frame assembly comprises a cubic frame and a sphere mounted within the cubic frame.

19. A rotational device for tangibly experiencing movement of a three-dimensional object in four dimensions, comprising:
- an outer frame comprising a plurality of wires forming a three-dimensional structure defining an interior of the outer frame, wherein the wires are arranged in spaced-apart configuration with one another enabling visibility of the interior of the outer frame from outside the outer frame; and
- an inner cubic frame assembly movably mounted for rotation within the interior of the outer frame, wherein the inner cubic frame assembly is visible from outside the outer frame, and further wherein the inner cubic frame assembly comprises a cubic frame and a sphere mounted within the cubic frame.

20. The rotational device of claim 19, wherein the sphere is rigidly and non-movably connected to the cubic frame.

21. The rotational device of claim 19, wherein the sphere is mounted to the cubic frame such that the sphere is movable relative to the cubic frame.

\* \* \* \* \*